United States Patent [19]

Hamisch, Jr.

[11] 4,438,950

[45] Mar. 27, 1984

[54] COMPOSITE LABEL WEB, PRICE TAG AND RE-PRICE LABEL COMBINATION, AND METHOD OF PRICE AND RE-PRICE MARKING

[75] Inventor: Paul H. Hamisch, Jr., Franklin, Ohio

[73] Assignee: Monarch Marking Systems, Inc., Dayton, Ohio

[21] Appl. No.: 430,087

[22] Filed: Sep. 30, 1982

Related U.S. Application Data

[62] Division of Ser. No. 236,414, Feb. 20, 1981, abandoned.

[51] Int. Cl.[3] .......... B32B 3/10

[52] U.S. Cl. .......... 283/70; 428/42; 283/81

[58] Field of Search .......... 40/2 R; 206/390, 813, 206/820; 283/70, 74, 79, 80, 81; 428/40–43, 428/202, 906

[56] References Cited

U.S. PATENT DOCUMENTS

| | | | |
|---|---|---|---|
| 1,681,769 | 8/1928 | Heston | 283/79 X |
| 3,711,683 | 1/1973 | Hamisch Sr. | 283/56 X |
| 3,885,334 | 5/1975 | Banks | 40/2 R |
| 4,116,747 | 9/1978 | Hamisch, Jr. | 156/384 |
| 4,128,954 | 12/1978 | White | 40/2 R X |
| 4,188,427 | 2/1980 | Grass | 40/2 R |
| 4,201,403 | 5/1980 | Turner | 283/74 |
| 4,260,656 | 4/1981 | Mullen | 283/81 |
| 4,309,468 | 1/1982 | St. Aubin | 428/42 |
| 4,329,191 | 5/1982 | Barber | 283/81 X |

FOREIGN PATENT DOCUMENTS 1292962 10/1972 United Kingdom .

*Primary Examiner*—Paul A. Bell
*Attorney, Agent, or Firm*—Joseph J. Grass

[57] ABSTRACT

There is disclosed a composite label web having pressure sensitive labels especially adapted for re-pricing. The composite label web is of a type in which pressure sensitive adhesive is on the underside of the label and the outer side of the label is free of adhesive and can be printed with re-price data. The label can, however, be applied with a hand-held labeler to the underside of a tag and thereafter the label is manually folded so that the printed re-price data appears on the same side as printed price data at the outer side of the tag. Also disclosed is the resultant tag and re-price label combination, and method of price and re-price marking using such labels.

10 Claims, 10 Drawing Figures

COMPOSITE LABEL WEB, PRICE TAG AND RE-PRICE LABEL COMBINATION, AND METHOD OF PRICE AND RE-PRICE MARKING

CROSS-REFERENCE TO RELATED APPLICATION

This application is a division of Ser. No. 236,414, filed Feb. 20, 1981 and assigned to the same assignee as the present application, now abandoned.

BACKGROUND OF THE INVENTION

1. Field of the Invention

This invention relates to the field of composite label webs, to price tag and re-price label combinations, and to method of price and re-price marking.

2. Brief Description of the Prior Art

A re-pricing method in which a label is applied over printed price data on a tag or label is disclosed in U.S. Pat. No. 3,711,683 granted Jan. 16, 1973 to Paul H. Hamisch, Sr. and Paul H. Hamisch, Jr. An example of two and three part tags is disclosed in U.S. Pat. No. 3,885,334 granted May 27, 1975 to Paul J. Banks. U.S. Pat. No. 4,188,427 granted Feb. 12, 1980 to Joseph J. Grass discloses a multi-part label used for re-pricing, and the Brief Description of the Prior Art section appearing in columns 1 through 3 describes various multi-part labels that have been used in the United States. Such a two-part label can be adhered to the outer surface of a tag to indicate both the regular price and a sale price. U.S. Pat. No. 1,681,769 to Charles B. Heston granted Aug. 21, 1928 discloses a three-part label having gummed parts which are gummed on their under surfaces and a coupon of double thickness which carries a suitable legend on its face. British Pat. No. 1,292,962 discloses a composite web of three-part labels useful in connection with "premium offers".

Another arrangement known in the United States for re-pricing involves use of a composite label web of two-part labels in which the underside of each label is free of adhesive, but the outer side of one label part has a coating of pressure sensitive adhesive and the outer surface of the other label part is adapted to be printed with re-price data. The adhesive on the one label part is covered with a release lines or carrier web which covers the adhesive. Such a composite label can be printed in a table top printed or it can be printed in a hand-held labeler which is adapted to feed such a composite web, but in either case the labels are required to be manually stripped or peeled from the carrier web and manually applied to the underside of a tag to be re-priced at a marginal edge of the tag.

SUMMARY OF THE INVENTION

This invention relates to a low-cost composite label web which can be used in a hand-held labeler for printing and applying re-price labels to a tag. The composite label web is of a type in which pressure sensitive adhesive is only on the underside of the label, with the outer side of the label being free of adhesive. The outer side can be printed with price data and re-price data in one embodiment, or with re-price data alone in another embodiment. The data can be printed with a hand-held labeler and applied by the labeler directly to the underside of a tag which is to be re-priced. The label is applied in the same manner as such a labeler is used to apply labels to a wide variety of articles. A typical type of labeler is disclosed in U.S. Pat. No. 4,116,747 granted Sept. 26, 1978 to Paul H. Hamisch, Jr. but having a print head which will print data on the correct part or parts of the label.

A composite label web in accordance with one specific embodiment of the invention comprises a longitudinally extending carrier web, a series of labels releasably adhered to the carrier web, each label having first and second laterally spaced longitudinally extending lines of weakening dividing the label into longitudinally extending first, second and third label parts, with the second label part being disposed between the related first the third label parts, the outer side of the first, second and third label parts being free of adhesive, at least the marginal free side edge of the underside of the first label part being free of adhesive, the undersides of the second and third label parts having a coating of pressure sensitive adhesive releasably adhering the first and second label parts to the carrier web, the outer side of the first label part being adapted to be printed with re-price data, and the first line of weakening defining a hinge and the first label part being capable of being folded about the hinge and adhered at its underside to the adhesive on the underside of the second label part. Re-pricing is effected without obliterating the price already on the tag.

In accordance with another specific embodiment, the first label part is entirely free of adhesive and the second line of weakening defines the hinge about which the first and second label parts can pivot.

Applicant's invention also relates to a tag and label combination which is simple and inexpensive to make. In accordance with one specific embodiment, a portion of the label is applied to the marginal edge of a tag at the underside of the tag with another portion of the label projecting beyond tag. The outer side of the tag contains printed price data and the projecting portion of the label contains printed re-price data. The projecting portion is folded upon itself so that re-price data is on the same side of the tag as the price data on the tag. The folded portion is adhered together by pressure sensitive adhesive at the underside of the label. In accordance with another specific embodiment a portion of the label is applied to the marginal edge of a tag at its underside, and another portion of the label projects beyond the tag. The projecting portion of the label contains both printed price data and printed re-price data. The projecting portion is folded along the terminal edge of the tag and attached by pressure sensitive adhesive to the marginal edge at the outer side of the tag. An end portion or part of the tag is provided by a line of weakening. The end portion is free of adhesive and contains the re-price data and can be torn from the remainder of the label.

The method of the invention results in a tag and label combination as defined above. Economies are achieved because the label can be printed and applied using a hand-held labeler.

DETAILED DESCRIPTION OF THE PREFERRED EMBODIMENTS

Figure 7:
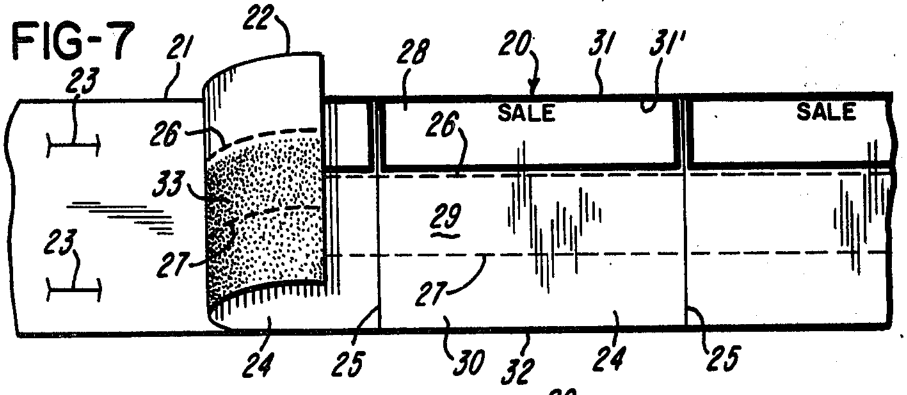
FIG. 7 is a top plan view of a composite web of re-price labels with one of the labels peeled back to expose its underside.
Figure 8:
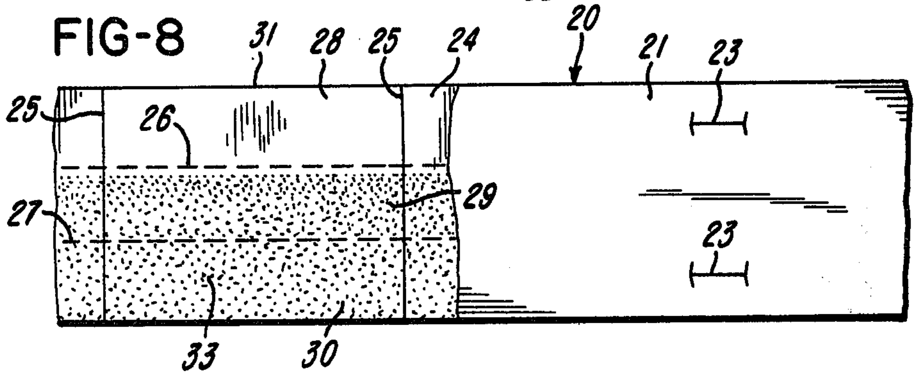
FIG. 8 is a bottom plan view of the composite label web with a portion of the carrier web removed for clarity.

With reference initially to FIGS. 7 and 8, there is disclosed a composite label web generally indicated at 20 which includes a longitudinally extending carrier web 21 and a label web 22. The carrier web 21 has a series of cuts 23 disposed at longitudinally spaced-apart intervals which are engageable by a toothed driver of a labeler to effect advance of the web. The label web 21 is divided into a series of labels 24 by longitudinally spaced butt cuts 25. The labels 24 are shown to be divided by first and second laterally spaced longitudinally extending lines of weakening 26 and 27 into first, second and third label parts 28, 29 and 30. As shown, the second label part 29 is disposed between the first label part 28 and the third label part 30. The label part 29 has a free side edge 31 and the label part 30 has a free side edge 32. The label part 28 has a rectangular printed boarder 31' defining a field where re-price data 28' is to be printed. It is preferred that a coating of adhesive 33 be applied to the underside of the label material web 22 at the undersides of the second label part 29 and the third label part 30. The adhesive 33 releasably adheres the labels 24 to the carrier web 21. It is preferred that the label part 28 be entirely free of adhesive. In another embodiment not shown, the undersides of the label parts 28 would be coated with adhesive except for the marginal free side edge adjacent the free side edge 31.

Figures 1, 2, 3, 4, 5:
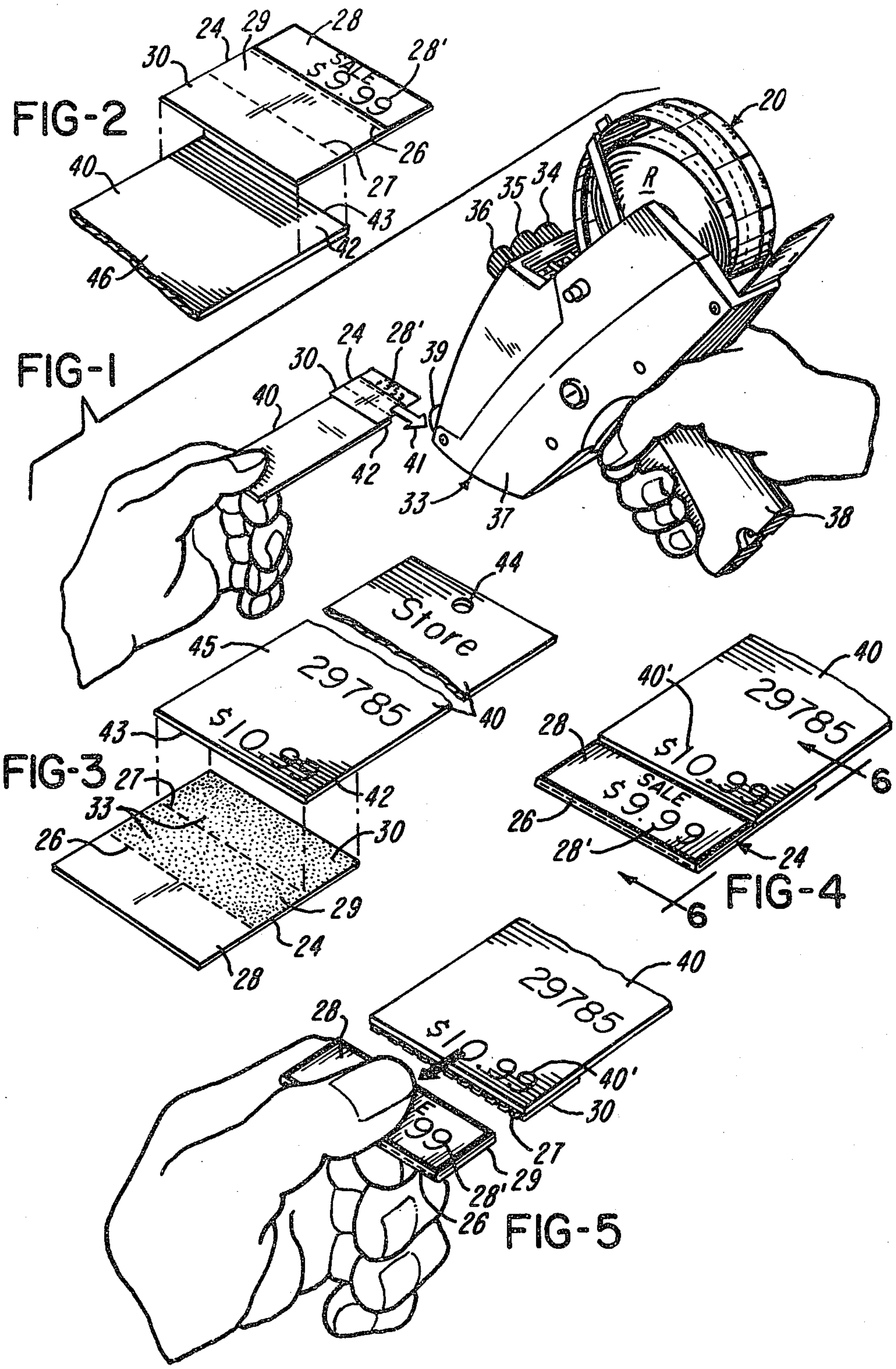
FIG. 1 is a perspective view showing a re-pricing method in which a re-price label is applied to the underside of the tag using a labeler.
FIG. 2 is a fragmentary exploded perspective view showing the manner in which a re-price label is oriented with respect to a tag.
FIG. 3 is a fragmentary exploded perspective view showing the manner in which the re-price label is oriented with respect to the tag, but differing from FIG. 2 in that FIG. 3 shows the underside of the re-price label.
FIG. 4 is a fragmentary perspective view showing the combination of the price tag and the re-price label.
FIG. 5 is a fragmentary perspective view showing the re-price label as having been severed along a line of weakening.

With reference now to FIG. 1, there is shown a hand-held labeler 33 of the type shown in U.S. Pat. No. 4,116,747, except that the labeler 33 is shown to have a three-line print head settable by three knobs 34, 35 and 36. Alternatively the labeler 33 can be equipped with a print head which will only print on label part 28. The labeler 33 has a housing 37 with a handle 38. An applicator 39 is used to apply a label 24. FIG. 1 also shows a tag, specifically a price tag 40, to which a printed re-price label 24 has just been applied. An arrow 41 shows the direction in which the labeler 33 is moved relative to the tag 40 during application of the label 24. As shown the label 24 is adhered to the underside of the tag 41 at a marginal edge 42 of the tag 40.

FIG. 2 shows the tag 40 and label 24 of FIG. 1 in exploded form. The third label part 30 is shown generally aligned with the marginal edge 42 at one end of the tag 40. The label parts 29 and 30 are considered to be a projecting portion of the label 24 because they project beyond end edge 43 of the tag 40. As best shown in FIG. 3, the adhesive 33 at the underside of the third label part 30 is adhered to the marginal end edge portion 42 of the tag 40. The tag 40 is shown to have an attacher hole 44 by which the tag 40 can be attached to a garment for example, by suitable means such as a plastic fastener. However, any suitable type of tag can be provided. The tag 40 has an upper surface 45 and an underside 46 (FIG. 2). The outer side 45 can contain a wide variety of information such as inventory codes, store name, etc. in addition to the price which is normally at the marginal end portion 42 of the tag 40 which is opposite the attacher hole 44.

Figure 6:
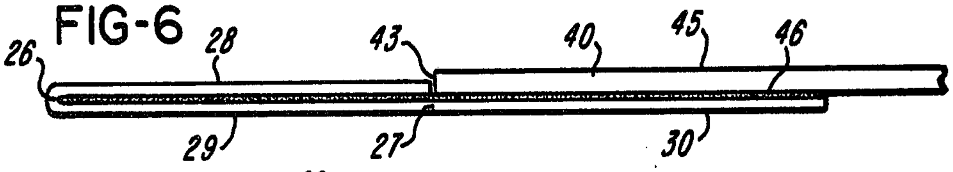
FIG. 6 is a sectional view taken along line 6—6 of FIG. 4.

After the label 24 is applied to the underside of the tag as shown in FIG. 1, the projecting portion, which comprises the first label part 28 and the second label part 29, is inversely folded about the line of weakening 26 to the position shown in FIGS. 4 and 6. It is apparent that the indicia 28' on the first label part 28 is on the same side as the outer side 45 of the tag 40 so that the price indicia 28' on the label part 28 is visible along with the price indicia 40' of the tag 40 as shown in FIG. 4. The label 24 is illustrated as being used for temporary price markdowns. In the event the sale is no longer in effect, the projecting portion which has been folded as indicated in FIGS. 4, 5 and 6 is torn along the line of weakening 27 and discarded. The only price left on the tag 40 is price indicia 40' and there is no sign that the merchandise was ever offered at a sale price. The third label part 30 which can be devoid of any printing remains adhered to the underside of the tag 40.

Figure 9:
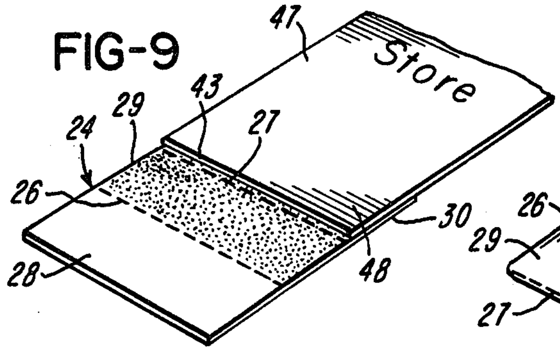
FIG. 9 is a perspective view showing a fragmentary portion of a tag and a label carrying both the regular price and the sale price with a portion of the label having been applied to the underside of the tag.
Figure 10:
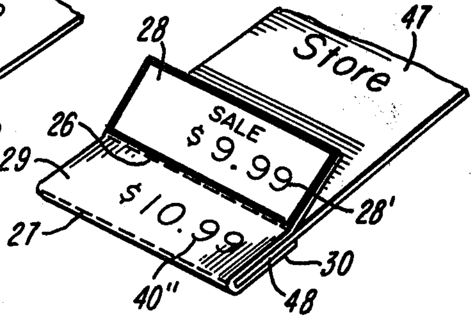
FIG. 10 is a perspective view showing a fragmentary portion of the tag, with the label of FIG. 9 being completely applied to the tag.

The label 24 can also be used in conjunction with a tag 47 that does not contain price data. The tag 47 can, however, contain a variety of other information about the product with which the tag 47 is associated. The label 24 has been applied to the tag 47 (FIG. 9) in the same manner as the label 24 was applied to the tag 40. The projecting portion is shown in FIG. 10 as having been folded about the line of weakening 27, with the label part 29 adhered to the outer side of the marginal edge 48 of the tag 47. In the embodiment of FIGS. 9 and 10, however, the label 24 is printed with two lines of price data 28' and 40''. The projecting portion has accordingly been wrapped about the marginal end portion 48 into a U-shaped configuration and is intended to remain permanently attached to the tag 47. The label part 28 which is free of adhesive has indicia 28' indicating the sale price and can be removed by tearing along the line of weakening 26 at the end of a sale.

In using the method of re-price marking as disclosed in connection with FIGS. 1 through 8 of the drawings, the labeler 33 is threaded with a composite web 20. The labeler 33 holds a supply of the composite web 20 in the form of a roll R. The labeler 33 is adapted to print three lines of data on the tag 40, but the knobs 35 and 36 are set to blanks so that the respective lines do not print on the respective label parts 29 and 30. The knob 34 is set so that re-price data 28' will be printed on the label part 28 of the label 24 as indicated in FIGS. 1 and 2. Operation of the labeler 33 prints and dispenses a label into label applying position with respect to applicator 39. The tag 40 can be held by the user's one hand and the labeler 33 can be held in the user's other hand, and the tag 40 and labeler 33 are moved relative to each other so that the third label part 20 is adhered to the marginal edge 42 of the tag 40. Thereafter, the labeler 43 is moved away in the direction of arrow 41 and thereupon the user manually folds the label part 28 about the line of weakening 26 to the position shown in FIGS. 4 and 6. The line of weakening 26 defines a hinge. The labeler 33 can be operated again to print and apply another re-price label 24 to another tag.

It is advantageous that at least the free marginal side edge portion of the label part 28 be free of adhesive. If the free marginal side edge portion of the label part 28 contains adhesive and the free marginal side edge portion of the label part 28 overlaps the marginal edge at the outer surface of the tag 40 due to inaccurate positioning of the label part 30 to the underside of the tag 40, the adhesive 33 on the underside of the label part 28 would stick to the outer side of the tag 40 adjacent terminal end 43. This would make removal of the label parts 28 and 29 from the tag 40 difficult.

With respect to the embodiment of FIGS. 9 and 10, the selector knobs 34 and 35 are set to cause re-price data 28' and price data 40" to be printed and the selector knob 36 can be set to blanks. Thereupon, the label part 28 is printed with re-price data 28' and the label part 29 is printed with price data 40" by operating the labeler 33. The label 24 is applied to the tag 47 in the same way as the label 24 is applied to the tag 40, however, the label parts 28 and 29 are folded as a unit about the line of weakening 27 which defines a hinge so that the label part 29 is adhered to the marginal end of the tag 47 at its outer surface with the label part 28 remaining connected to the label part 29 at the line of weakening 26. The label part 28 with the re-price data 28' can be removed at the end of the sale by tearing along the line of weakening 26.

In the embodiments of FIGS. 1 through 8, and 9 and 10, the lines of weakening 26 and 27 can be provided by any suitable means, e.g., perforation cuts, creasing or scoring.

Other embodiments and modifications of this invention will suggest themselves to those skilled in the art, and all such of these as come within the spirit of this invention are included within its scope as best defined by the appended claims.

I claim:

1. Method of re-pricing, comprising the steps of: providing a price tag having an outer side and an underside with price data printed on its outer side, providing a re-price label having an outer side and an underside with first and second spaced lines of weakening dividing the re-price label into first, second and third label parts, the outer side of the re-price label being free of adhesive, the underside of the re-price label having pressure sensitive adhesive, printing re-price data on the outer side of the first label part which differs from the price data on the price tag, applying the third label part by means of the adhesive to the underside of the price tag with the first and second label parts projecting beyond the price tag, and folding the first label part about the first line of weakening and adhering the first and second label parts together with the adhesive so that the re-price data printed on the first label part are on the same side as the printed price data on the price tag.

2. Method of re-pricing, comprising the steps of: providing a price tag having an outer side and an underside with price data printed on its outer side, providing a re-price label having an outer side and an underside with first and second spaced lines of weakening dividing the re-price label into first, second and third label parts, the outer side of the re-price label being free of adhesive, the underside of the re-price label having pressure sensitive adhesive, printing re-price data on the outer side of the first label part which differs from the price data on the price tag, applying the third label part by means of the adhesive to the underside of the price tag with the first and second label parts projecting beyond the price tag, folding the first label part about the first line of weakening and adhering the first and second label parts together with the adhesive so that the re-price data printed on the first label part are on the same side as the printed price data on the price tag, and thereafter removing the adhered first and second label parts by tearing along the second line of weakening.

3. Method of re-pricing, comprising the steps of: providing a price tag having an outer side and an underside with price data printed on its outer side, providing a re-price label having an outer side and an underside with first and second spaced lines of weakening dividing the re-price label into first, second and third label parts, the outer side of the re-price label being free of adhesive, the underside of the re-price label having pressure sensitive adhesive, providing a hand-held labeler loaded with a composite web of the re-price labels releasably carried on a carrier web, manually grasping the labeler and printing re-price data on the outer side of the first label part which differs from the price data on the price tag, using the labeler to apply the third label part by means of the adhesive to the underside of the price tag with the first and second label parts projecting beyond the price tag, and folding the first label part about the first line of weakening and adhering the first and second label parts together with the adhesive so that the re-price data printed on the first label part are on the same side as the printed price data on the price tag.

4. Method of re-pricing, comprising the steps of: providing a price tag having an outer side and an underside with price data printed on its outer side, providing a re-price label having an outer side and an underside with first and second spaced lines of weakening dividing the re-price label into first, second and third label parts, the outer side of the re-price label being free of adhesive, the underside of the re-price label having pressure sensitive adhesive, providing a hand-held labeler loaded with a composite web of re-price labels releasably carried on a carrier web, manually grasping the labeler and printing re-price data on the other side of the first label part which differs from the price data on the price tag, using the labeler to apply the third label part by means of the adhesive to the underside of the price tag with the first and second label parts projecting beyond the price tag, folding the first label part about the first line of weakening and adhering the first and second label parts together with the adhesive so that the re-price data printed on the first label part are on the same side as the printed price data on the price tag, and thereafter removing the adhered first and second label parts by tearing along the second line of weakening.

5. Method of pricing and re-pricing, comprising the steps of: providing a tag having an outer side and an underside, providing a hand-held labeler loaded with a composite web of labels releasably carried on a carrier web, with each label having laterally spaced first and second longitudinally extending lines of weakening dividing each label into first, second and third label parts, with the first line of weakening defining adjacent side edges of the first and second label parts and the second line of weakening defining adjacent side edges of the second and third label parts, with the second label part being disposed between the first and third label parts, with the first label part being free of adhesive and being removable by tearing at the first line of weakening and the second and third label parts having a coating of pressure sensitive adhesive on their undersides, manually grasping the labeler, printing price data on the second label part and re-price data on the first label part using the labeler, moving the tag and the labeler relative to each other and adhering the underside of the third label part to a marginal edge on the underside of the tag, folding the first and second label parts about the second line of weakening and adhering the second label part to the marginal edge at the outer side of the tag so that the price and re-price data are on the same side as the outer side of the tag.

6. Method of pricing and re-pricing, comprising the steps of: providing a tag having an outer side and an underside, with each label having laterally spaced first and second longitudinally extending lines of weakening dividing each label into first, second and third label parts, with the first line of weakening defining adjacent side edges of the first and second label parts and the second line of weakening defining adjacent side edges of the second and third label parts, with the second label part being disposed between the first and third label parts, with the first label part being free of adhesive and being removable by tearing at the first line of weakening and the second and third label parts having a coating of pressure sensitive adhesive on their undersides, printing price data on the second label part and re-price data on the first label part using the labeler, adhering the underside of the third label part to a marginal edge on the underside of the tag, folding the first and second label parts about the second line of weakening and adhering the second label part to the marginal edge at the outer side of the tag so that the price and re-price data are on the same side as the outer side of the tag.

7. Method of pricing and re-pricing, comprising the steps of: providing a tag having an outer side and an underside, with each label having laterally spaced first and second longitudinally extending lines of weakening dividing each label into first, second and third label parts, with the first line of weakening defining adjacent side edges of the first and second label parts, the second line of weakening defining adjacent side edges of the second and third label parts, with the second label part being disposed between the first and third label parts, with the first label part being free of adhesive and being removable by tearing at the first line of weakening and the second and third label parts having a coating of pressure sensitive on their undersides, printing price data on the second label part and re-price data on the first label part using the labeler, adhering the underside of the third label part to a marginal edge on the underside of the tag, folding the first and second label parts about the second line of weakening and adhering the second label part to the marginal edge at the outer side of the tag so that the price and re-price data are on the same side as the outer side of the tag, and thereafter removing the first label part by tearing along the first line of weakening.

8. Method of pricing and re-pricing, comprising the steps of: providing a tag having an outer side and an underside, providing a label having an outer side and an underside with the label having a line of weakening providing a removable label part and a remaining label portion, the removable label part being free of adhesive, printing re-price data on the outer side of the removable label part, printing price data on the outer side of the remaining label portion, adhering the underside of the remaining label portion to a marginal edge of the tag, wherein the adhering step includes adhering one part of the remaining label portion to a marginal edge at the underside of the tag and thereafter wrapping and another part of the remaining portion about the terminal edge of the tag and adhering said other part onto the adjacent outer marginal edge at the outer side of the tag so that the price and re-price data are on the same side as the outer side of the tag.

9. Method of pricing and re-pricing, comprising the steps of: providing a tag having an outer side and an underside, providing a label having an outer side and an underside with the label having a line of weakening providing a removable label part and a remaining label portion, the removable label part being free of adhesive, printing re-price data on the outer side of the removable label part, printing price data on the outer side of the remaining label portion, adhering the underside of the remaining label portion to a marginal edge of the tag, wherein the adhering step includes adhering one part of the remaining label portion to a marginal edge at the underside of the tag and thereafter wrapping and another part of the remaining portion about the terminal edge of the tag and adhering said other part onto the adjacent outer marginal edge at the outer side of the tag so that the price and re-price data are on the same side as the outer side of the tag, and thereafter removing the first label part by tearing along the line of weakening.

10. A composite web of pressure sensitive labels adapted to be used for re-pricing, comprising: a longitudinally extending carrier web, a series of labels releasably adhered to the carrier web, each label having first and second laterally spaced longitudinally extending lines of weakening dividing the label into longitudinally extending first, second and third label parts, the second label part of each label being disposed between the related first and third label parts, the outer side of the first, second and third label parts being free of adhesive, at least the marginal free side edge of the underside of the first label part being free of adhesive, the undersides of the second and third label parts having a coating of pressure sensitive adhesive releasably adhering the first and second label parts to the carrier web, the outer side of the first label part being adapted to be printed with re-price data, and the first line of weakening defining a hinge and first label part being capable of being folded about the hinge and adhered at its underside to the adhesive on the underside of the second label part.

* * * * *

UNITED STATES PATENT AND TRADEMARK OFFICE
CERTIFICATE OF CORRECTION

PATENT NO. : 4,438,950

DATED : March 27, 1984

INVENTOR(S) : Paul H. Hamisch, Jr.

It is certified that error appears in the above-identified patent and that said Letters Patent are hereby corrected as shown below:

Column 4, line 67, "20" should be --30--. Column 6, line 47, "other" should be --outer--.

Signed and Sealed this

*Twenty-first* Day of *May 1985*

[SEAL]

*Attest:*

DONALD J. QUIGG

*Attesting Officer* *Acting Commissioner of Patents and Trademarks*